(12) United States Patent
Jin et al.

(10) Patent No.: US 8,122,568 B2
(45) Date of Patent: Feb. 28, 2012

(54) SWING HINGE MODULE AND PORTABLE TERMINAL EMPLOYING THE SAME

(75) Inventors: Jae Chul Jin, Suwon-si (KR); Jeong Hun Seo, Suwon-si (KR); Ki Taek Kim, Yongin-si (KR); Jin Soo Kim, Seoul (KR); Young Ki Kim, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 449 days.

(21) Appl. No.: 12/274,839

(22) Filed: Nov. 20, 2008

(65) Prior Publication Data
US 2009/0144937 A1 Jun. 11, 2009

(30) Foreign Application Priority Data
Dec. 5, 2007 (KR) ........................ 10-2007-0125253

(51) Int. Cl.
*E05D 11/06* (2006.01)
*H04M 1/00* (2006.01)
(52) U.S. Cl. ................ 16/357; 16/284; 16/291; 16/325; 16/341; 455/575.3; 455/575.4; 379/433.13
(58) Field of Classification Search ................ 16/321, 16/325, 327, 328, 348, 355, 357, 360, 358, 16/361, 291, 293, 277, 296, 319, 373, 278, 16/281, 335, 345, 284, 341; 455/575.3, 575.4; 379/433.13
See application file for complete search history.

(56) References Cited

U.S. PATENT DOCUMENTS

| 2,132,266 | A | * | 10/1938 | Lefevre | 16/361 |
|---|---|---|---|---|---|
| 2,777,156 | A | * | 1/1957 | Weisgarber | 16/361 |
| 3,879,146 | A | * | 4/1975 | Mayer | 403/93 |
| 7,684,822 | B2 | * | 3/2010 | Park et al. | 455/550.1 |
| 2005/0250563 | A1 | * | 11/2005 | Nan | 455/575.4 |
| 2005/0272488 | A1 | * | 12/2005 | Zou | 455/575.4 |
| 2006/0079303 | A1 | * | 4/2006 | Lee | 455/575.4 |
| 2006/0172764 | A1 | * | 8/2006 | Makino | 455/550.1 |
| 2007/0103443 | A1 | * | 5/2007 | Park et al. | 345/169 |
| 2008/0051162 | A1 | * | 2/2008 | Kim et al. | 455/575.3 |
| 2008/0081493 | A1 | * | 4/2008 | Oh | 439/131 |
| 2008/0119251 | A1 | * | 5/2008 | Oh | 455/575.4 |
| 2008/0176607 | A1 | * | 7/2008 | Jin et al. | 455/566 |
| 2008/0188269 | A1 | * | 8/2008 | Jin et al. | 455/566 |
| 2010/0197372 | A1 | * | 8/2010 | Takagi et al. | 455/575.4 |

* cited by examiner

*Primary Examiner* — Jack Lavinder
*Assistant Examiner* — Emily Morgan
(74) *Attorney, Agent, or Firm* — H.C. Park & Associates, PLC

(57) ABSTRACT

A swing hinge module bidirectionally swinging a movable body and a portable terminal having the same are disclosed. The swing hinge module includes a rotation cam, a rotation shaft, a fixed plate, and a guide pin. The rotation cam is fixed to the movable body to be rotated with the movable body, and has stopping recesses on an outer circumference of the rotation cam to set a rotation angle of the movable body. The rotation shaft is coupled with a central area of the rotation cam, and the fixed plate is coupled to the fixed body and has a guide hole to receive the rotation shaft. The guide pin is coupled to the fixed plate and contacts the outer circumference of the rotation cam to support the rotation cam.

20 Claims, 10 Drawing Sheets

SWING HINGE MODULE AND PORTABLE TERMINAL EMPLOYING THE SAME

CROSS REFERENCE TO RELATED APPLICATION

This application claims priority from and the benefit of Korean Patent Application No. 10-2007-0125253, filed on Dec. 5, 2007, which is hereby incorporated by reference for all purposes as if fully set forth herein.

BACKGROUND OF THE INVENTION

1. Field of the Invention

The present invention relates generally to a portable terminal and, more particularly, to a swing hinge module that has a simple structure and a movable body that swings, and a portable terminal having the same.

2. Discussion of the Background

In general, a mobile communication terminal refers to terminals, such as a personal mobile communication services terminal (PMCST), a personal digital assistant (PDA) terminal, a smart phone, an international mobile telecommunication (IMT)-2000 terminal, and a wireless local area network (LAN) terminal, that can realize various functions, such as a wireless communication function, using application programs, while being carried by a user.

Due to advances in communication technologies, mobile communication terminals have become compact and lightweight, and may be equipped with various services, such as an MP3 player service, a digital camera service, a navigation service, and an Internet access service. As a result, mobile communication terminals may function as complex communication terminals and are becoming necessities of modern society.

In addition, recently developed portable terminals may be equipped with a function to receive satellite or terrestrial digital multimedia broadcasting (DMB), and in order to support this function, various swing-type portable terminals have been developed to conveniently open a display of the portable terminal to be positioned in the transversal direction.

In an existing swing-type portable terminal, the movable body may swing in only one direction. A swing hinge module swinging the movable body may have a very intricate structure. Thus, there may be a large number of parts included in the swing hinge module and the manufacturing costs may be high.

SUMMARY OF THE INVENTION

The present invention provides a bidirectional swing-type portable terminal.

The present invention also provides a swing hinge module having a simple structure.

Additional features of the invention will be set forth in the description which follows, and in part will be apparent from the description, or may be learned by practice of the invention.

The present invention discloses a swing-type portable terminal including a fixed body, a movable body, and a swing hinge module connecting the movable body to the fixed body such that the movable body swings. The swing hinge module includes a rotation cam, a cylindrical rotation shaft, a fixed plate, and a guide pin. The rotation cam is fixed to the movable body to be rotated with the movable body, and has a plurality of stopping recesses defined on an outer circumference of the rotation cam to set a rotation angle of the movable body. The cylindrical rotation shaft has a first end coupled to a central area of the rotation cam. The fixed plate has a first side coupled to the fixed body and a linear guide hole to receive a second end of the rotation shaft. The second end of the rotation shaft is opposite the first end of the rotation shaft. The guide pin is coupled to a second side of the fixed plate at a position near an end of the guide hole and contacts the outer circumference of the rotation cam to support the rotation cam. The second side of the fixed plate is opposite the first side of the fixed plate.

The present invention also discloses a swing hinge module of a portable terminal including a rotation cam, a cylindrical rotation shaft, a fixed plate, and a guide pin. The rotation cam has a plurality of stopping recesses defined on the outer circumference of the rotation cam to set a rotation angle, and the cylindrical rotation shaft has a first end coupled with a central area of the rotation cam. The fixed plate has a linear guide hole to receive a second end of the rotation shaft. The second end of the rotation shaft is opposite the first end of the rotation shaft. The guide pin is coupled to a side of the fixed plate at a position near an end of the guide hole and contacts the outer circumference of the rotation cam to support the rotation cam.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1A:
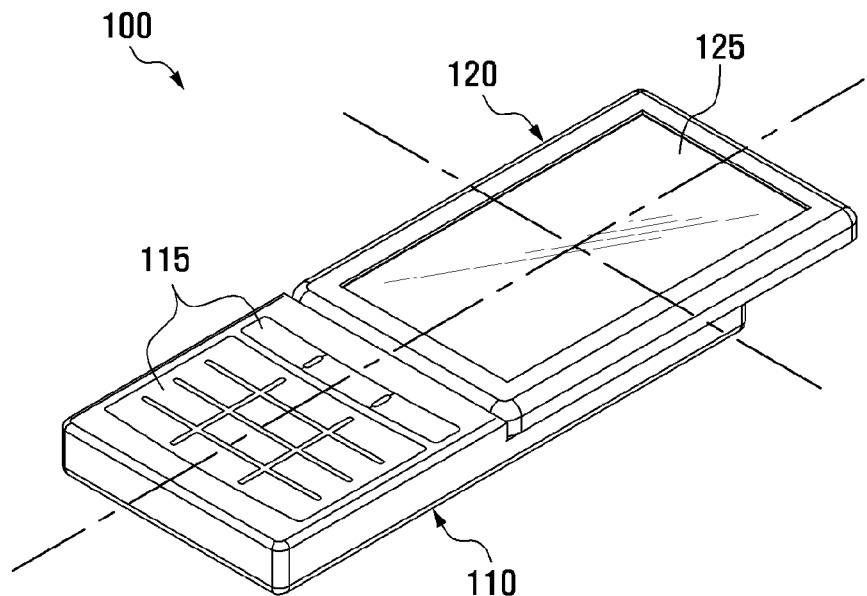
FIG. 1A and FIG. 1B are schematic views respectively showing a normal state and a swung state of a portable terminal having a swing hinge module according to an exemplary embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present.

Hereinafter, exemplary embodiments of the present invention will be described in detail with reference to the accompanying drawings. In the description, a portable terminal refers to a swing-type portable terminal.

Figure 1B:
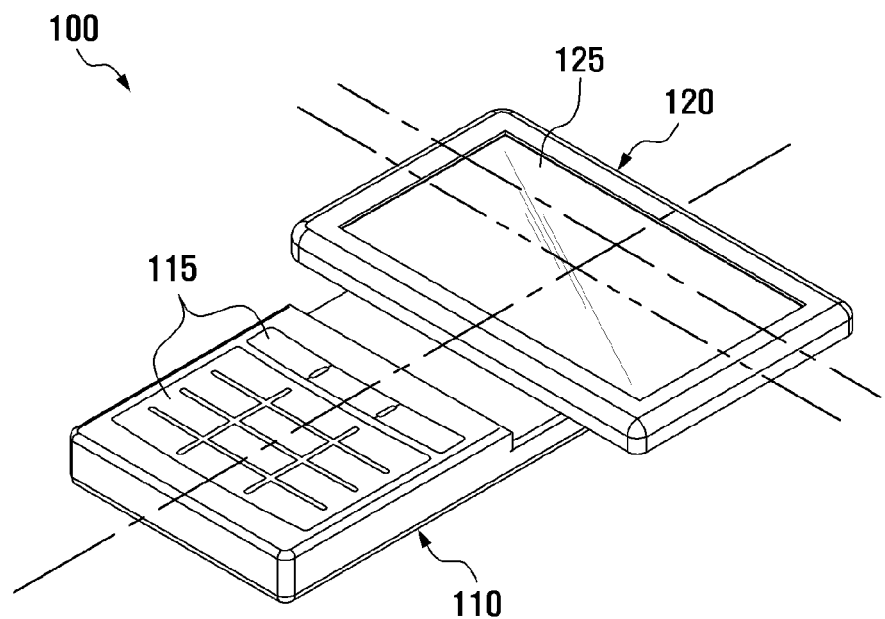
Figure 2:
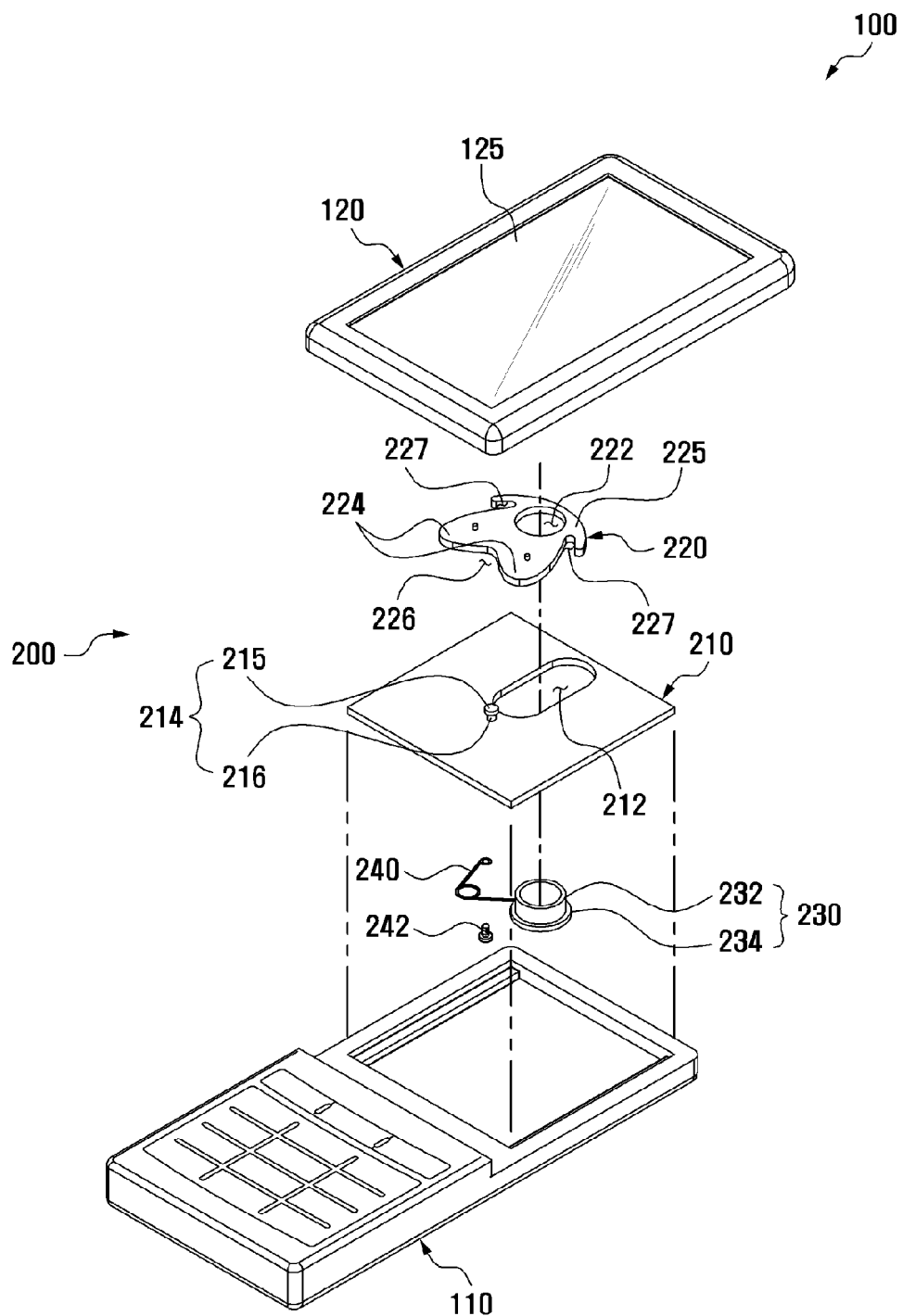
FIG. 2 is an exploded perspective view showing the coupling between the portable terminal according to an exemplary embodiment of the present invention and a swing hinge module.
Figure 3A:
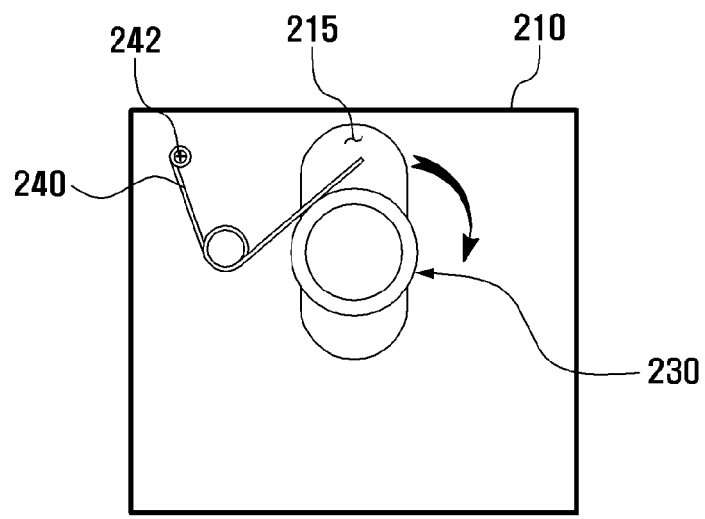
FIG. 3A and FIG. 3B are views schematically showing an elastic unit of the portable terminal according to an exemplary embodiment of the present invention.
Figure 3B:
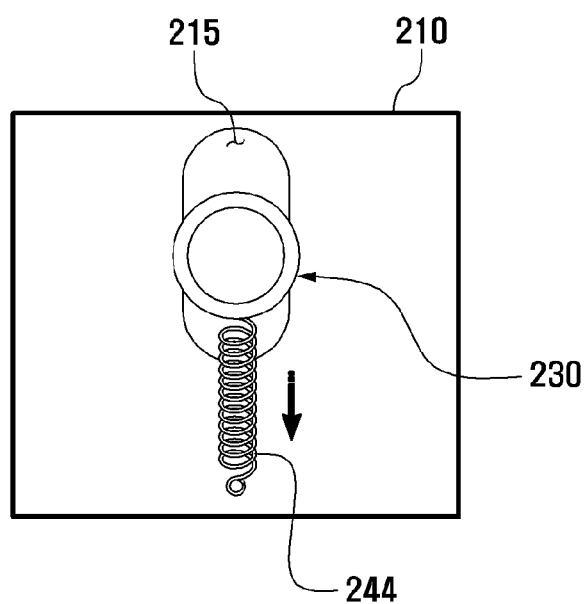

FIG. 1A and FIG. 1B are schematic views respectively showing a normal state and a swung state of a portable terminal having a swing hinge module according to an exemplary embodiment of the present invention, FIG. 2 is an exploded perspective view showing the coupling between the portable terminal and a swing hinge module, and FIG. 3A and FIG. 3B are views schematically showing an elastic unit of the portable terminal.

Referring to FIG. 1A, FIG. 1B, FIG. 2, FIG. 3A, and FIG. 3B, a portable terminal 100 according to an exemplary embodiment of the present invention includes a fixed body 110, a movable body 120, and a swing hinge module 200.

The fixed body 110 is a non-swinging part that includes a key input unit 115 through which numbers and characters are input to the portable terminal 100 and a battery (not shown). The key input unit 115 may include alphanumeric keys to input alphanumeric characters and function keys to input various commands and controls.

The movable body 120 swings about a rotation shaft 230, which is described below, when manipulated by a user and includes a display device 125, such as an LCD, of the portable terminal 100. Thus, the movable body 120 is coupled to the fixed body 110 to swing about the rotation shaft 230 of the swing hinge module 200.

The swing hinge module 200 provides an elastic force to the movable body 120 to semi-automatically swing the movable body 120. The swing hinge module 200 according to this exemplary embodiment of the present invention can swing the movable body 120 in both directions, that is, in both the clockwise direction and the counterclockwise direction. To this end, the swing hinge module 200 includes a rotation cam 220, the rotation shaft 230, a fixed plate 210, a guide pin 214, and an elastic unit 240.

The rotation cam 220 is fixed to the movable body 120 and swings together with the movable body 120. The rotation cam 220 includes two protrusions 224 and a reference stopping recess 226 defined between the protrusions 224. The rotation cam 220 includes locking steps 225 formed at opposite sides of the reference stopping recess 226 to restrict the swing of the movable body 120, and rotation stopping recesses 227 respectively defined at positions where the two protrusions 224 are connected to the locking steps 225. As such, the rotation cam 220 has three stopping recesses including one reference stopping recess 226 and two rotation stopping recesses 227.

The stopping recesses 226 and 227 formed on the outer circumference of the rotation cam 220 set a swing angle of the movable body 120 through the guide pin 214 described below. The reference stopping recess 226 is defined to maintain the basic state shown in FIG. 1A in which the movable body 120 has not been swung. The rotation stopping recesses 227 are defined to maintain and restrict a rotation range of the movable body 120 to 90 degrees. In other words, when the movable body 120 swings 90 degrees from a reference state, the movable body 120 is prevented from further rotation when a rotation stopping recess 227 becomes locked by the guide pin 214.

The rotation cam 220 has a through-hole 222 formed in the central area thereof such that the rotation shaft 230 serving as the rotation center of the movable body 120 is coupled in dependence with a shape of the through-hole 222. A first end of the rotation shaft 230 is fixed to the central area, that is, the through-hole of the rotation cam 220, and a hollow cylindrical body 232 is inserted into the fixed body 110, that is, a guide hole 212, described below, of the fixed plate 210. A second end of the rotation shaft 230, which is opposite the first end, is coupled with a ring locker 234 having a diameter greater than a width of the guide hole 212 so as to prevent the rotation shaft 230 from being separated from the guide hole 212. The hollow inside of the rotation shaft 230 and the through-hole 222 are used as a passage for signal lines (not shown) connecting the fixed body 110 to the display device or a flexible board.

The movable body 120 swings about the rotation shaft 230. The center of the rotation shaft 230 becomes a rotation center of the movable body 120. Thus, the rotation shaft 230 and the through-hole 225 through which the rotation shaft 230 is coupled with the rotation cam 220 are aligned at the center of the movable body 120 to be coupled with each other.

A side of the fixed plate 210 is fixed to the fixed body 110. In this case, the fixed plate 210 and the fixed body 110 define a space therebetween for the elastic unit 240 to be positioned. Moreover, the fixed plate 210 has a guide hole 212 formed in the central area thereof.

The guide hole 212 is a linear hole that is elongated from the central area of the fixed plate 210 in the longitudinal direction. The guide hole 212 serves as a space along which the rotation shaft 230 moves during the swing of the movable body 120. In other words, the rotation shaft 230 is inserted into and coupled with the fixed plate 210 to move along the guide hole 212. To this end, the guide hole 212 has an outer diameter greater than that of the body 232 of the rotation shaft 230 and a width less than a diameter of the locker 234 such that the rotation shaft 230 may easily move along the guide hole 212.

The guide pin 214 is coupled with a second side of the fixed plate 210. The guide pin 214 is coupled at a position near an end of the guide hole 212 positioned at the central area of the fixed plate 210 as shown in FIG. 2, and is aligned in the longitudinal direction of the guide hole 212. The guide pin 213 includes a rod-shaped supporter 216 having a first end coupled to the fixed plate 210 and an expander 215 coupled with a second end of the supporter 216, which is opposite the first end, and expanding over the rotation cam 220 to contact the supporter 216 and prevent the rotation cam 220 from being separated therefrom.

The supporter 216 of the guide pin 214 contacts the outer circumference of the rotation cam 220 that is permanently coupled to the movable body 120. Thus, during the swing of the movable body 120, the guide pin 214 is locked by the stopping recesses 226 and 227 of the rotation cam 220. Therefore, the swinging of the movable body 120 is restricted to within 90 degrees of a reference state.

The elastic unit 240 provides an elastic force to push the rotation shaft 230 toward the guide pin 214. To this end, as shown in FIG. 3A, the elastic unit 240 has an end coupled to a side of the fixed plate 210 by a fixing device 242 and an opposite end coupled to the rotation shaft 230.

The rotation cam 220, which is coupled with the end of the rotation shaft 230 by the elastic unit 240, elastically contacts a side of the guide pin 214 at the outer circumference thereof.

When a force greater than the elastic force provided by the elastic unit 240 is exerted on the rotation cam 220, the movable body 120 and the rotation shaft 230 connected thereto move along the guide hole 212. In this exemplary embodiment, a torsion spring is used as the elastic unit 240 as shown in FIG. 3A, however, the elastic unit 240 is not limited to this but may employ various springs (or elastic bodies) providing elastic forces to the rotation shaft 230, such as a tension spring 244 as shown in FIG. 3B.

Operation of the portable terminal 100 having the swing hinge module 200 according to an exemplary embodiment of the present invention will be described as follows.

FIG. 4A, FIG. 4B, FIG. 4C, FIG. 4D, and FIG. 4E are perspective plan views respectively showing a swing operation of the portable terminal 100 according to an exemplary embodiment of the present invention. In FIG. 4A, FIG. 4B, FIG. 4C, FIG. 4D, and FIG. 4E, the guide pin 214 is depicted by omitting the expander 215 for illustrative convenience. Only outlines of the movable body 120 are depicted in association with the movement of the rotation cam 220 fixed to the movable body 120 and rotating therewith.

Figure 4A:
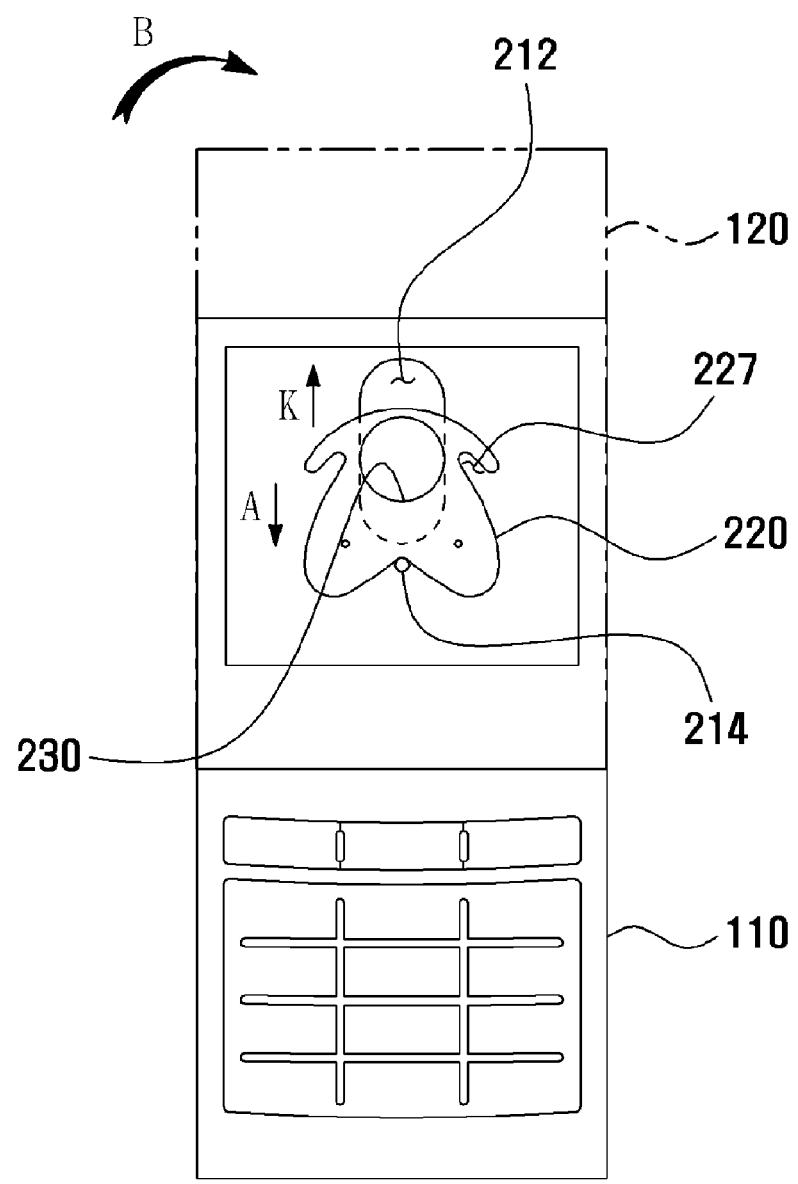
FIG. 4A, FIG. 4B, FIG. 4C, FIG. 4D, and FIG. 4E are perspective plan views respectively showing a swing operation of the portable terminal according to an exemplary embodiment of the present invention.

The portable terminal 100 according to an exemplary embodiment of the present invention maintains the basic state depicted in FIG. 1A, and FIG. 4A, that is, a state before the movable body 120 is swung. In other words, the guide pin 214 of the fixed plate 210 is positioned in the reference stopping recess 226 of the rotation cam 220 and the rotation cam 230 is positioned at an intermediate position of the guide hole 212. In this state, the elastic unit 240 provides the elastic force to the rotation shaft 230 toward the guide pin 214 (in the direction A). Thus, the force in the direction A is exerted to the movable body 120. However, since the guide pin 214 is positioned in the reference stopping recess 226 of the rotation cam 220 to support the movable body 120, the rotation shaft 230 does not move. Thus, the movable body 120 maintains the basic state shown in FIG. 1A until an external force is exerted. As such, in the portable terminal 100 according to the exemplary embodiment of the present invention, the movable body 120 is fixed without shaking by the elastic force from the elastic unit 240, the rotation cam 220, and the guide pin 214 in the basic state.

When the user applies a force to the movable body 120 to use the portable terminal 100, the movable body 120 swings clockwise or counterclockwise. Unlike conventional portable terminals, in exemplary embodiments of the present invention, the movable body 120 is capable of swinging in two directions (clockwise and counterclockwise). Hereinafter, a case when the movable body 120 swings in the clockwise direction (a direction B) will be described. However, this operation is the same as a case when the movable body 120 swings in the counterclockwise direction.

Figure 4B:
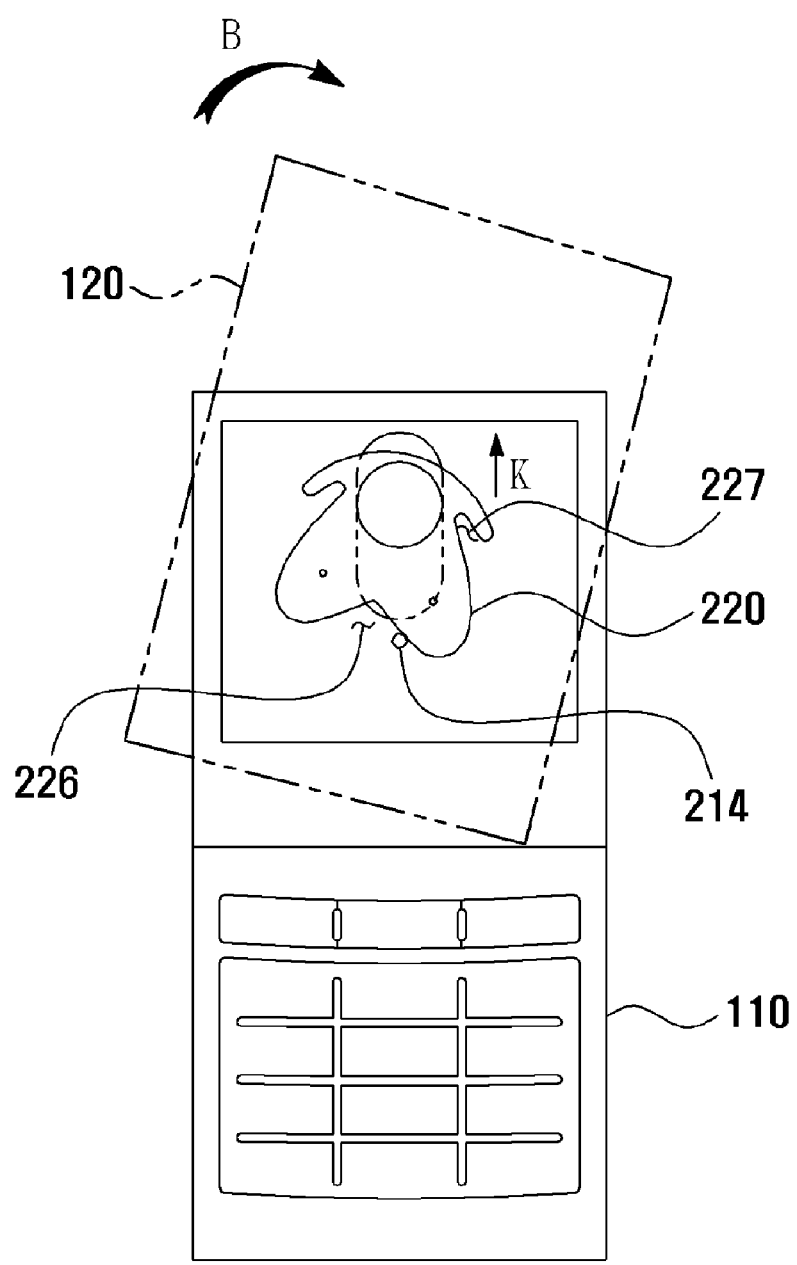

As the movable body 120 swings in the direction B as shown in FIG. 4B, the rotation shaft 230 of the movable body 120 moves in a direction K away from the guide pin 214 due to the protrusion 224 of the rotation cam 220 and the guide pin 214. In other words, a protruding portion of the protrusion 224 contacts the guide pin 214 so that the rotation shaft 230 moves as far as the protrusion 224 protrudes in the direction K. Due to this, the movable body 120 and the rotation cam 220 coupled therewith move together in the direction K.

As such, when the rotation shaft 230 moves away from the guide pin 214, the elastic unit 230 providing the elastic force to the rotation shaft 230 is compressed and the elastic unit 240 provides a stronger elastic force to the rotation shaft 230.

Figure 4C:
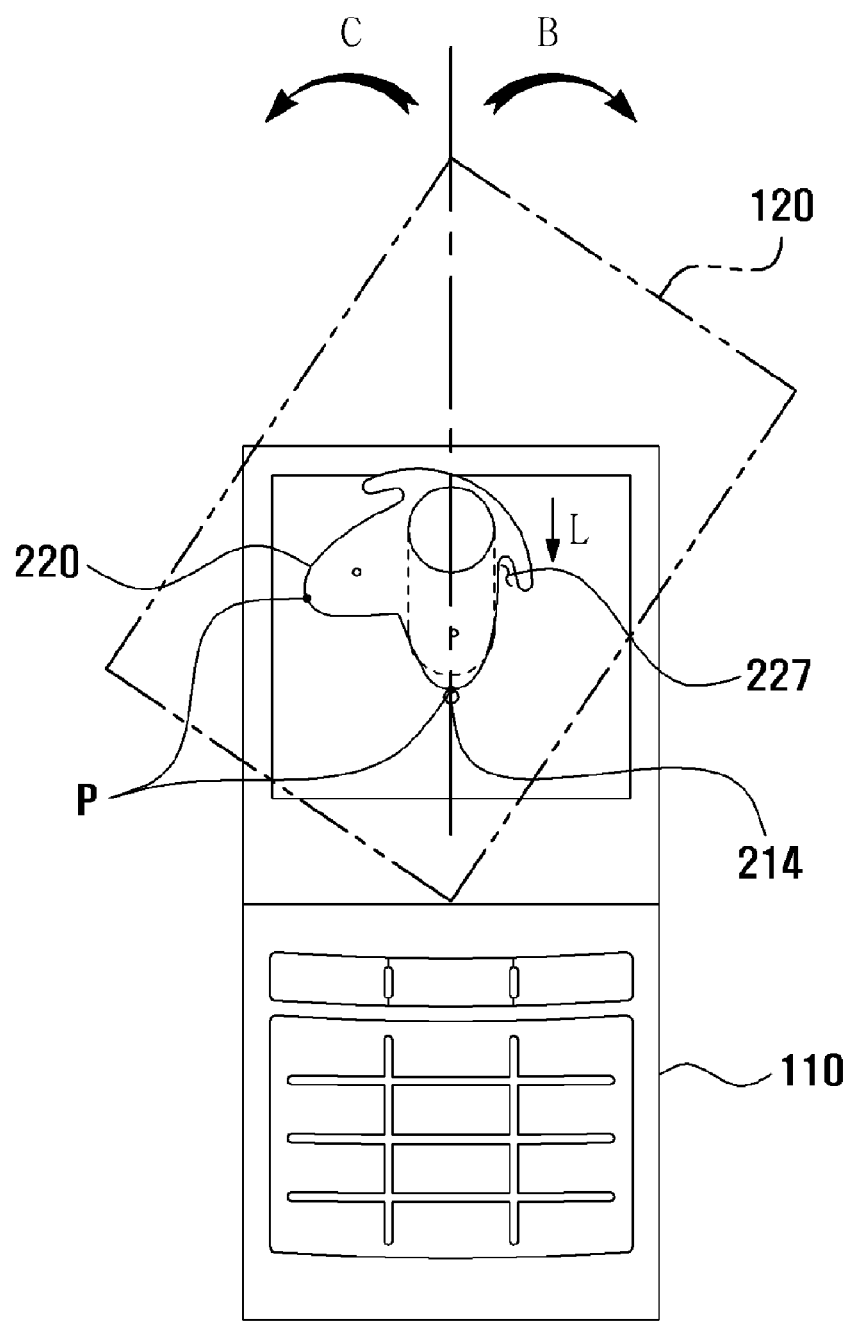

Next, in the state shown in FIG. 4B, when the user continuously provides a force to the movable body 120, the movable body 120 continues swinging and the state shown in FIG. 4C is achieved.

When the movable body 120 reaches the state of FIG. 4C, the guide pin 214 is positioned at a position P of the protrusion 224. The position P is a position farthest from the rotation shaft 230 on the rotation cam 220. Thus, when the guide pin 214 is positioned at the position P, a distance between the guide pin 214 and the rotation shaft 230 is maximal. The rotation shaft 230 moves to the farthest position from the guide pin 214 within the guide hole 212, that is, to the opposite end of the guide hole 212. Moreover, in the state shown in FIG. 4C, since the rotation shaft 230 has moved as far as possible in the direction against the elastic force, the elastic unit 240 is maximally compressed. Thus, the elastic unit 240 provides the strongest elastic force to the rotation shaft 230.

In the swing hinge module 200 according to the exemplary embodiment of the present invention, the force of moving the rotation shaft 230 toward the guide pin 214 by the elastic unit 240 may be semi-permanently exerted. Thus, the movable body 120 may swing in the direction where the rotation shaft 230 as the rotation center thereof can be near to the guide pin 214. When, in the state of FIG. 4C, the user slightly swings the movable body 120 in the direction B (or in the direction C), the movable body 120 automatically swings along the outer circumference of the rotation cam 220 in the direction where the rotation shaft 230 is near the guide pin 214 (in a direction L). At the same time, the rotation shaft 230 moves in the direction near the guide pin (in the direction L).

Figure 4D:
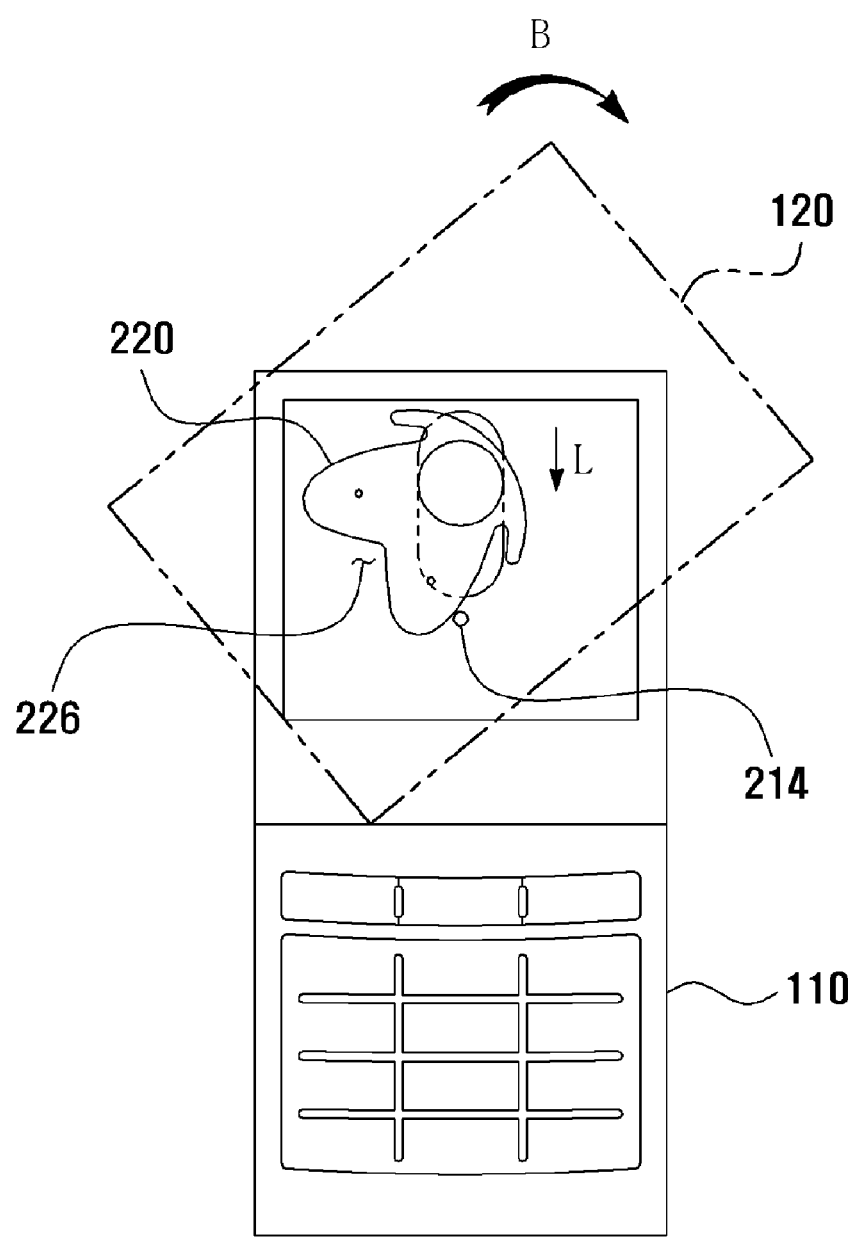
Figure 4E:
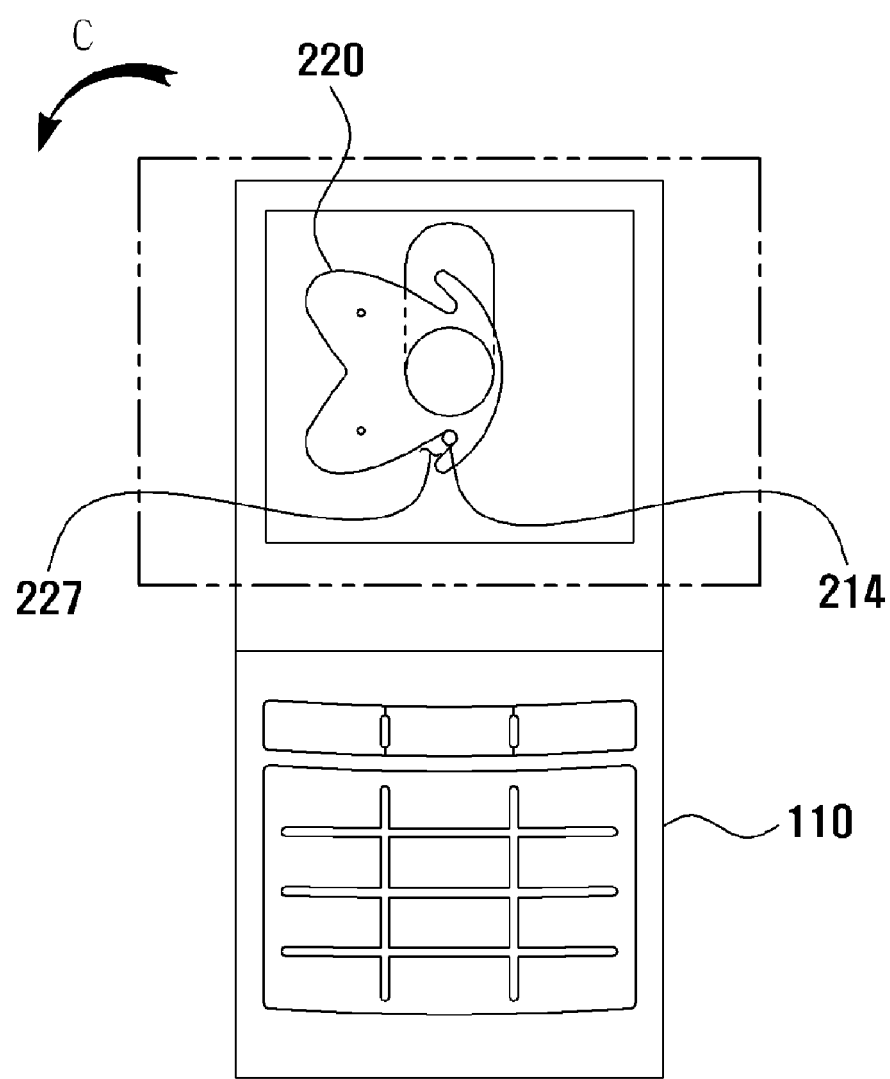

When the movable body 120 swings through the operation as described above, the portable terminal 100 reaches the states shown in FIG. 4D and FIG. 4E.

When the movable body 120 swings and reaches the state shown in FIG. 4E, the guide pin 214 is caught within the rotation stopping recess 227 of the rotation cam 220. Therefore, the movable body 120 does not move further. Even if the user exerts more force to the movable body 120, the movable body 120 does not swing further due to the locking step 225 defined in the rotation cam 220.

When the movable body 120 swings to reach the state shown in FIG. 4E, the display device of the movable body 120 may be transversely positioned as shown in FIG. 1B (or FIG. 4E). In this case, the rotation shaft 230 of the movable body 120 is positioned at a position different from that in the basic state shown in FIG. 1A. Although the rotation shaft 230, as described above, is positioned at the intermediate position of the guide hole 212 at the basic state of FIG. 4A, the rotation shaft 230 is positioned at the lowest end, that is, the end of the guide hole 212 at the state shown in FIG. 4E when the movable body 120 swings to a maximal point.

When the movable body 120 swings and the display device is transversely positioned, the user may easily view DMB, a moving picture, and the like using the display device.

Next, an operation of returning the movable body 120 to the original position, that is, the basic state will be described.

When the user pushes the movable body 120 in the opposite direction, that is, in the counterclockwise direction (direction C) from the state shown in FIG. 4E, the movable body 120 swings along the outer circumference of the rotation cam 220 in the corresponding direction. Then, as shown in FIG. 4C, the rotation shaft 230 moves again in the direction away from the guide pin 214 (the direction K of FIG. 4A) until the guide pin 214 is positioned at the position P of the rotation cam 220. Thus, the elastic unit 240 is shrunk to provide stronger elastic force to the rotation shaft 230.

When the movable body 120 further swings in the direction C to reach the state shown in FIG. 4C and the guide pin 214 passes through the position P of the rotation cam 220, the movable body 120 may automatically swing due to the elastic force of the elastic unit 240 even in the absence of a force exerted by the user.

As such, when the reference stopping recess 226 of the rotation cam 220 catches the guide pin 214 during the swinging of the movable body 120, the movable body 120 stops swinging and the portable terminal 100 returns to the basic state shown in FIG. 4A.

As described above, in the swing hinge module according to an exemplary embodiment of the present invention and the portable terminal having the same, the movable body 120 swings along the outer circumference of the rotation cam 220 in both directions. Since the movable body 120 swings bidirectionally, user convenience may be increased. Thus, different functions may be provided to the bidirectional swings. For example, when the portable terminal 100 has the DMB function with a function of shooting an image, the functions may be performed according to the swings of the movable body 120. For example, when the user swings the movable body 120 clockwise, the portable terminal 100 may automatically perform the DMB function and directly display a broadcasting image on the display device 120. When the user swings the movable body 120 counterclockwise, the portable terminal 100 may automatically perform the function of shooting an image and display a preview image on the display device 125.

The function automatically performed due to the swinging of the movable body 120 is not limited to the DMB function and the camera function, but may be set to any function desired by the user.

A conventional swing-type portable terminal may be disadvantageous because corners of the movable body may contact the fixed body during the swinging of the movable body. In order to solve this problem, the movable body may protrude over the fixed body or the lower end of the movable body has an arc-shape. Alternatively, according to an exemplary embodiment of the present invention, the rotation shaft 230, which is arranged at the rotation center of the movable body 120, moves within the guide hole 212 during the swinging of the movable body 120. In other words, the movable body 120 moves in a direction away from the fixed body 110 when swinging. Even when the lower end of the movable body 120 is linear, the corners of the movable body 120 do not contact the fixed body 110.

Moreover, since the swing hinge module 200 is constructed with a minimum number of parts, time for assembling the swing hinge module 200 may be reduced during the manufacturing process and costs for the parts may be saved.

In the above-described exemplary embodiment, the case in which a distance from the reference stopping recess 226 to the lower side of the movable body 120 is different from a distance from the rotation stopping recesses 227 to the lateral sides of the movable body 120 has been described. In other words, in the portable terminal according to the above-described exemplary embodiment of the present invention, the lowest end of the movable body 120 may be very near the highest end of the key input unit 115 of the fixed body 110 as shown in FIG. 1A. However, referring to FIG. 1B, which shows the swinging of the movable body 120, the movable body 120 may be spaced apart from the highest end of the key input unit 115. This is because the distances from the respective stopping recesses are different with respect to the sides of the movable body 120. However, the swing hinge module according to an exemplary embodiment of the present invention and the portable terminal having the same are not limited to this configuration. In other exemplary embodiments, the distances may be the same to prevent the movable body 120 from being spaced apart from the highest end of the key input unit 115.

Figure 5A:
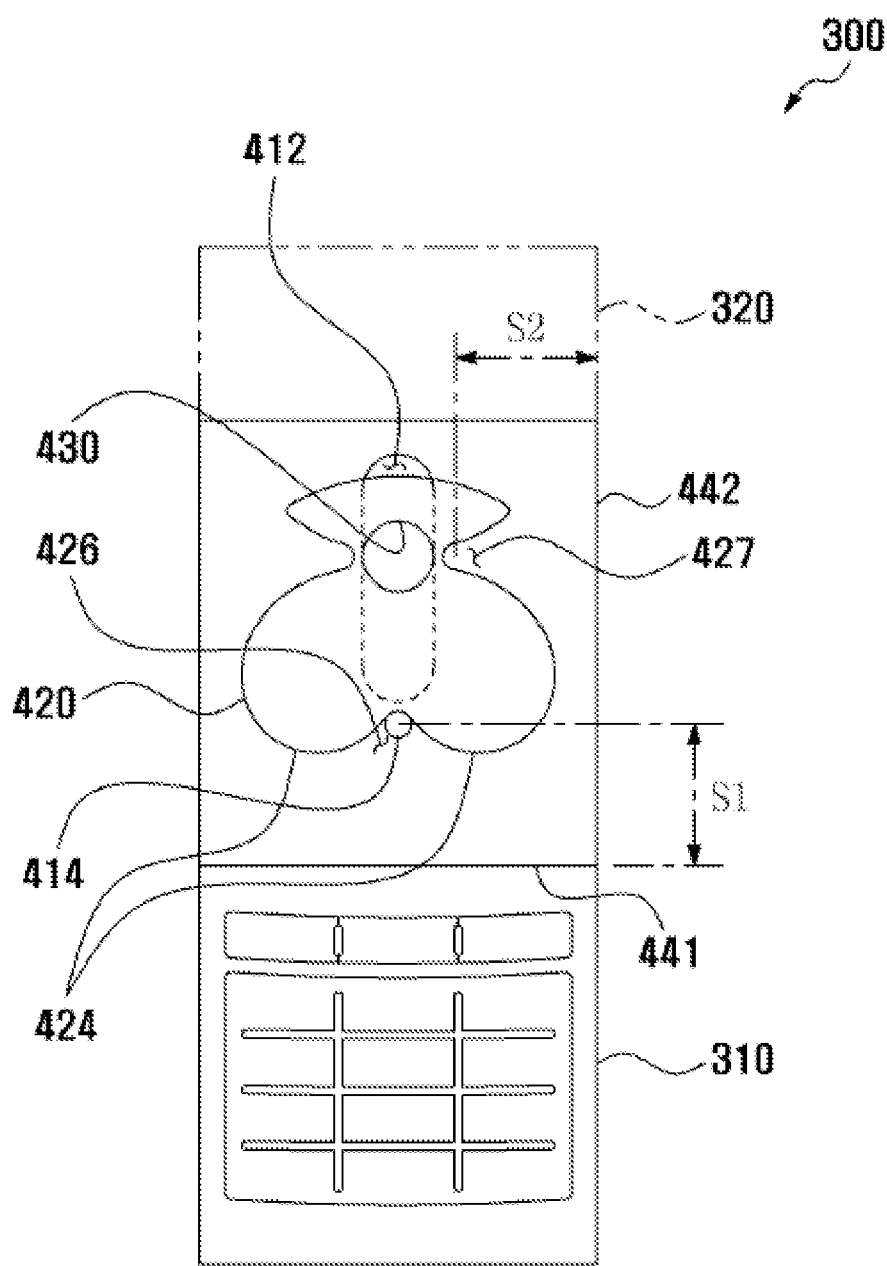
FIG. 5A and FIG. 5B are perspective plan views a portable terminal according to another exemplary embodiment of the present invention.
Figure 5B:
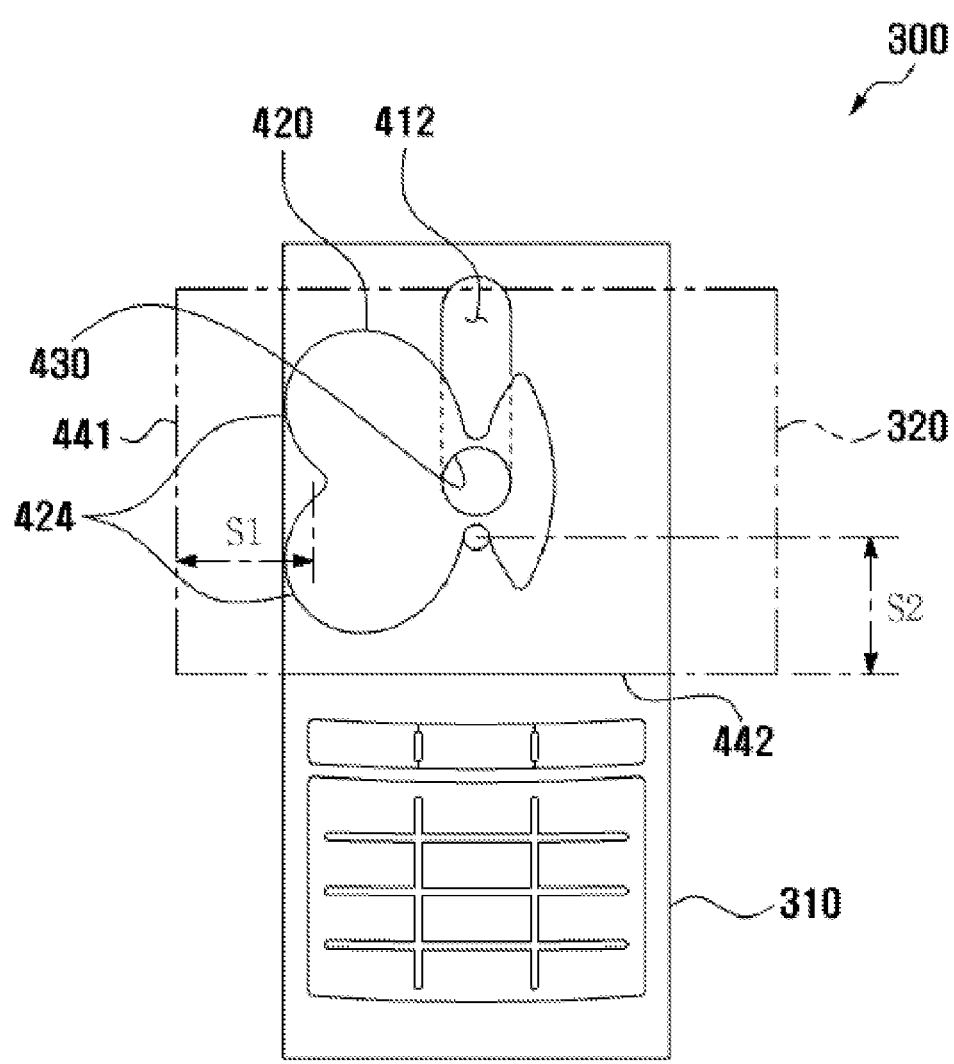

FIG. 5A and FIG. 5B are perspective plan views of a portable terminal according to another exemplary embodiment of the present invention.

Referring to FIG. 5A, a portable terminal 300 according to another exemplary embodiment of the present invention includes the same elements as those of the portable terminal 100 but has a different size of elements thereof, particularly a rotation cam 420. Thus, since the respective elements are assembled and operated in the same manner as those of the above-described portable terminal 300, their description will be omitted.

In this exemplary embodiment, in order to minimize a distance of a movable body 320 from a fixed body 310, a distance S1 from a stopping recess 426 to a first side 441 of the movable body 320 and a distance S2 from a stopping recess 427 to a second side 442 of the movable body 320 are the same. To this end, a size of a rotation cam 420 according to the exemplary embodiment of the present invention shown in FIG. 5A is greater than that of the rotation cam 220 of the above-described exemplary embodiment. In other words, the rotation cam 420 is configured such that the distance S1 from the reference stopping recess 426 to the first side 441 of the movable body 320 is equal to the distance S2 from the rotation stopping recesses 427 of the rotation cam 420 to the second side 442 of the movable body 320.

Since the rotation cam 420 of this exemplary embodiment is longer than that of the above-described exemplary embodiment, a maximum distance between a rotation shaft 430 and protrusions 424, that is a distance from the rotation cam to the position P of FIG. 4C, is longer than that of the portable terminal 100 (See FIG. 2) according to the above-described exemplary embodiment. Thus, a guide hole 412 formed in a fixed plate 410 is longer than that of the above-described exemplary embodiment.

As such, when the distances S1 and S2 from the respective stopping recesses 426 and 427 to the first and second sides 441, 442 of the movable body 320 are made to be equal to each other by changing the size of the rotation cam 420, the second side 442 of the movable body 320 that positioned at the lower end after the movable body 320 is swung is positioned on a line where the first side 441 of the movable body 320 was positioned before the swinging.

Thus, in the portable terminal 300 according to this exemplary embodiment of the present invention, since the movable body 320 is not spaced apart from the key input unit of the fixed body 310 but rather, is positioned near to the fixed body 210, the portable terminal may appear more stable.

Although the exemplary embodiments of the present invention have been described by examples such as cases where three stopping recesses are defined in the rotation cams, the present invention is not limited to these exemplary embodiments. New stopping recesses may be defined on the outer circumference of the protrusions such that the movable body can be stopped at various angles.

Although, in the above-described exemplary embodiments, cases where the movable body of the bar-type portable terminal swings have been described, the present invention may be applied to various portable terminals such as a folder-type portable terminal, a slide-type portable terminal, and the like, such that a display device swings.

Although the swing hinge module provided in a portable terminal has been described, exemplary embodiments of the present invention may be applied to any device including a fixed body and a movable body swinging about the fixed body.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A swing-type portable terminal, comprising:
   a fixed body;
   a movable body; and
   a swing hinge module connecting the movable body to the fixed body such that the movable body swings, the swing hinge module comprising:
      a rotation cam fixed to the movable body to be rotated with the movable body, the rotation cam comprising a plurality of stopping recesses defined on an outer circumference of the rotation cam to set a rotation angle of the movable body;
      a cylindrical rotation shaft comprising a first end coupled to a central area of the rotation cam and a second end being opposite the first end of the rotation shaft;
      a fixed plate having a first side coupled with the fixed body and a linear guide hole to receive the second end of the rotation shaft so that the rotation shaft moves therealong; and
      a guide pin coupled to a second side of the fixed plate at a position near an end of the guide hole and contacting the outer circumference of the rotation cam to support the rotation cam, the second side of the fixed plate being opposite the first side of the fixed plate.

2. The swing-type portable terminal of claim 1, further comprising an elastic unit comprising a first end coupled to the fixed plate and a second end coupled to the rotation shaft to push the rotation shaft toward the guide pin, the second end of the elastic unit being opposite the first end of the elastic unit.

3. The swing-type portable terminal of claim 2, wherein the outer circumference of the rotation cam contacts the guide pin.

4. The swing-type portable terminal of claim 3, wherein the rotation cam comprises:
   two protrusions protruding from a side of the rotation cam;
   locking steps formed in a side of the rotation cam opposite to the two protrusions to restrict the movable body from swinging;
   a reference stopping recess defined between the two protrusions; and
   rotation stopping recesses defined between respective protrusions and the locking steps.

5. The swing-type portable terminal of claim 4, wherein a distance from the reference stopping recess to a first side of the movable body is equal to a distance from one of the rotation stopping recesses to a second side of the movable body, and
   wherein the second side of the movable body is perpendicular to the first side of the movable body.

6. The swing-type portable terminal of claim 4, wherein the movable body swings clockwise and counterclockwise.

7. The swing-type portable terminal of claim 4, wherein the rotation shaft moves within the guide hole in a direction away from the guide pin when the movable body swings and the outer circumferences of the two protrusions of the rotation cam contact the guide pin.

8. The swing-type portable terminal of claim 7, wherein the movable body swings only within 90 degrees of an initial position thereof due to the rotation stopping recesses.

9. The swing-type portable terminal of claim 2, wherein the elastic unit comprises a torsion spring.

10. A swing hinge module of a portable terminal, comprising:
    a rotation cam comprising a plurality of stopping recesses defined on an outer circumference of the rotation cam to set a rotation angle;
    a cylindrical rotation shaft having a first end coupled to a central area of the rotation cam and a second end being opposite the first end of the rotation shaft;
    a fixed plate having a linear guide hole to receive the second end of the rotation shaft so that the rotation shaft moves therealong; and
    a guide pin coupled to a side of the fixed plate at a position near an end of the guide hole and contacting the outer circumference of the rotation cam to support the rotation cam.

11. The swing hinge module of claim 10, further comprising an elastic unit comprising a first end coupled to the fixed plate and a second end coupled to the rotation shaft to push the rotation shaft toward the guide pin, the second end of the elastic unit being opposite the first end of the elastic unit.

12. The swing hinge module of claim 11, wherein the outer circumference of the rotation cam contacts the guide pin.

13. The swing hinge module of claim 12, wherein the rotation cam comprises:
    two protrusions protruding from a side of the rotation cam;
    locking steps formed in a side of the rotation cam opposite to the two protrusions;
    a reference stopping recess defined between the two protrusions; and
    rotation stopping recesses defined between respective protrusions and the locking steps.

14. The swing hinge module of claim 13, wherein the rotation cam rotates clockwise and counterclockwise.

15. The swing hinge module of claim 13, wherein the rotation shaft moves within the guide hole in a direction away from the guide pin when the rotation cam rotates and the outer circumferences of the two protrusions of the rotation cam contact the guide pin.

16. The swing hinge module of claim 13, wherein the rotation cam rotates only within 90 degrees of an initial position thereof due to the rotation stopping recesses.

17. The swing hinge module of claim 11, wherein the elastic unit comprises a torsion spring.

18. The swing-type portable terminal of claim 1, wherein the guide pin comprises a rod-shaped supporter having a first end coupled to the fixed plate and an expander coupled to a second end of the rod-shaped supporter opposite the first end.

19. The swing-type portable terminal of claim 1, wherein a diameter of the second end of the rotation shaft is greater than a width of the linear guide hole, and
    wherein the fixed plate is arranged between the first end of the rotation shaft and the second end of the rotation shaft.

20. The swing-type portable terminal of claim 2, wherein the elastic unit pushes the rotation shaft along the linear guide hole.

* * * * *